(No Model.) 2 Sheets—Sheet 1.

J. H. LEA MOND.
Combined Lounge and Bath.

No. 233,153. Patented Oct. 12, 1880.

Witnesses:
Henry Giehling
Eugene N Eliot

Inventor
James H. Leamond (No Model.) 2 Sheets—Sheet 2.
J. H. LEAMOND.
Combined Lounge and Bath.
No. 233,153. Patented Oct. 12, 1880.
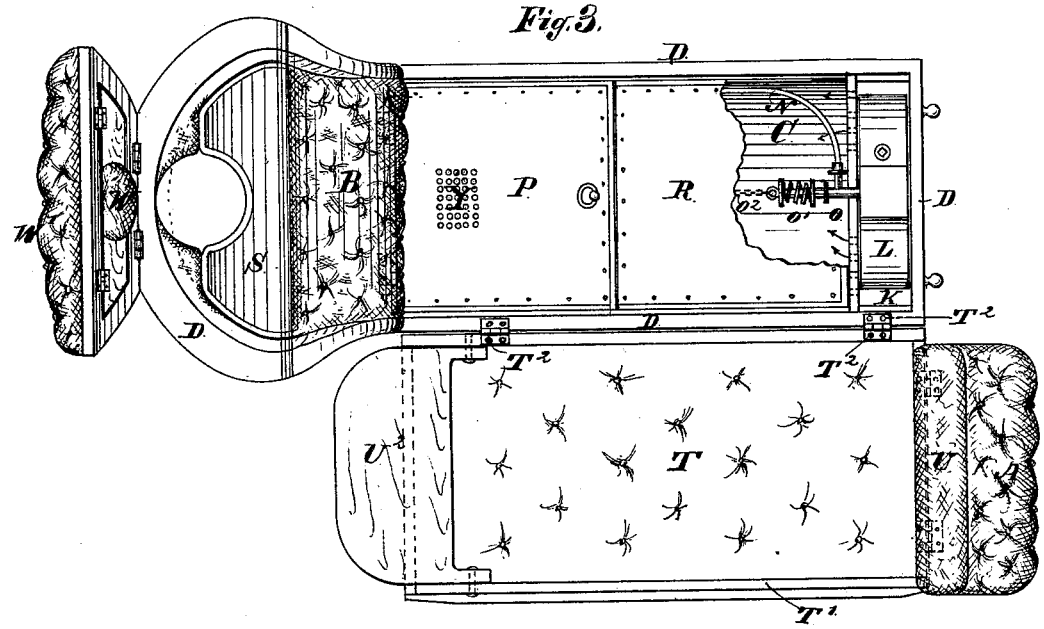
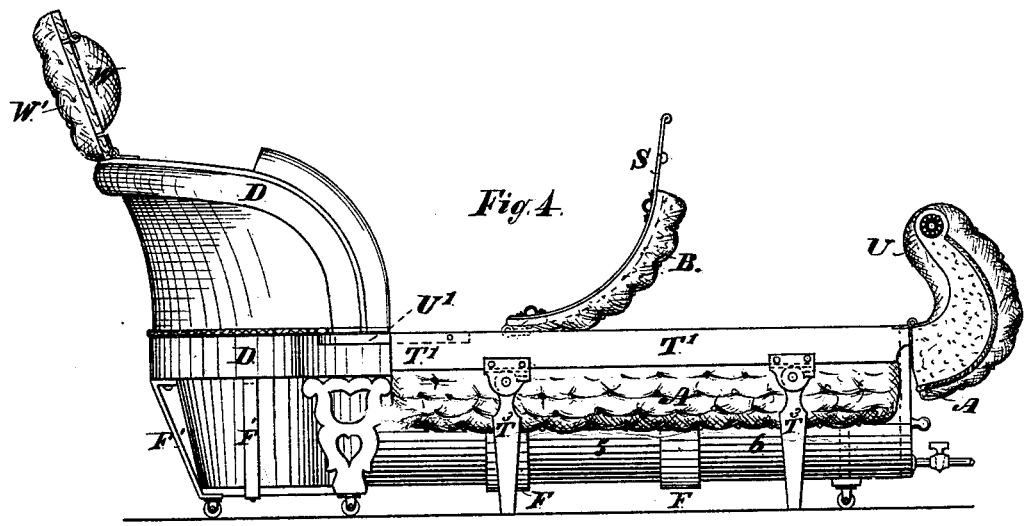
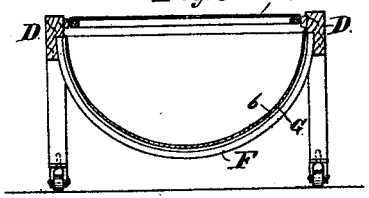
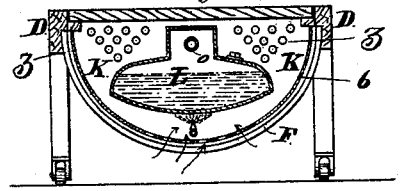
Witnesses:
Henry Fiddling.
Eugene N. Eliot.
Inventor.
James H. Leamond

UNITED STATES PATENT OFFICE.

JAMES H. LEA MOND, OF NEW YORK, N. Y.

COMBINED LOUNGE AND BATH.

SPECIFICATION forming part of Letters Patent No. 233,153, dated October 12, 1880.

Application filed July 24, 1880. (No model.)

*To all whom it may concern:*

Be it known that I, JAMES H. LEA MOND, of the city, county, and State of New York, have invented new and useful Improvements in a Combined Lounge and Bath, of which the following is a specification.

This invention pertains to that class of apparatus adapted for the treatment of diseases by vapor or liquid baths, and in combination with electricity; and the invention consists, first, in a combined lounge and bath, in the combination of several metallic sections or plates with insulating-divisions between for forming a vaporizing-chamber, as will hereinafter appear.

The invention also consists, in a combined lounge and bath, of electrical conductors, with two or more of the metallic sections forming a portion of a vaporizing-chamber, as will hereinafter appear.

The invention also consists in a combined lounge and bath formed of metallic plates or sections, with insulating-divisions between them, and forming a vaporizing-chamber, and having combined therewith a heating apparatus or generator of heat to produce vapor, as will hereinafter appear.

The invention also consists, in a combined lounge and bath formed of sectional plates, with insulating material between them, and with a boiler or vaporizer, of suitable inlet tubes or conduits to properly direct the vapor, as will hereinafter appear.

Figure 1:
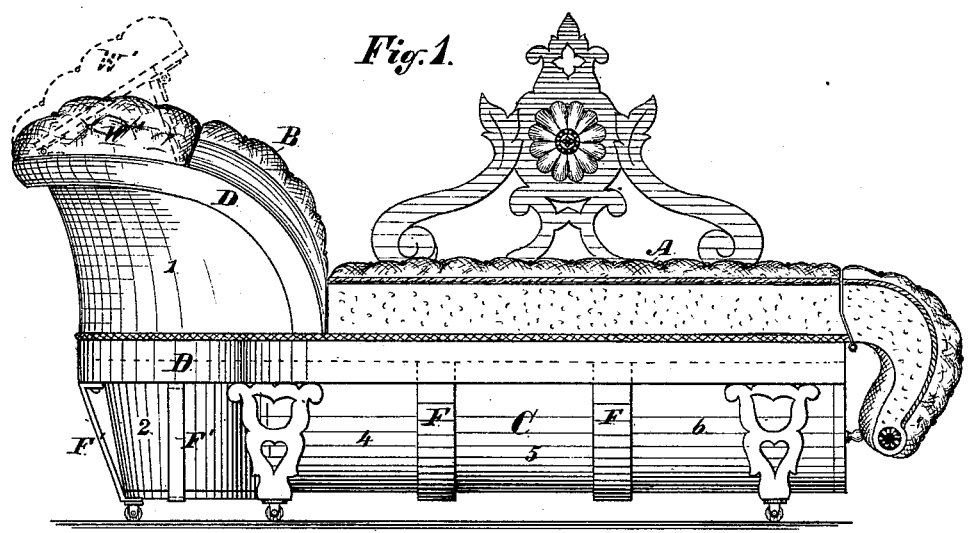
Figure 2:
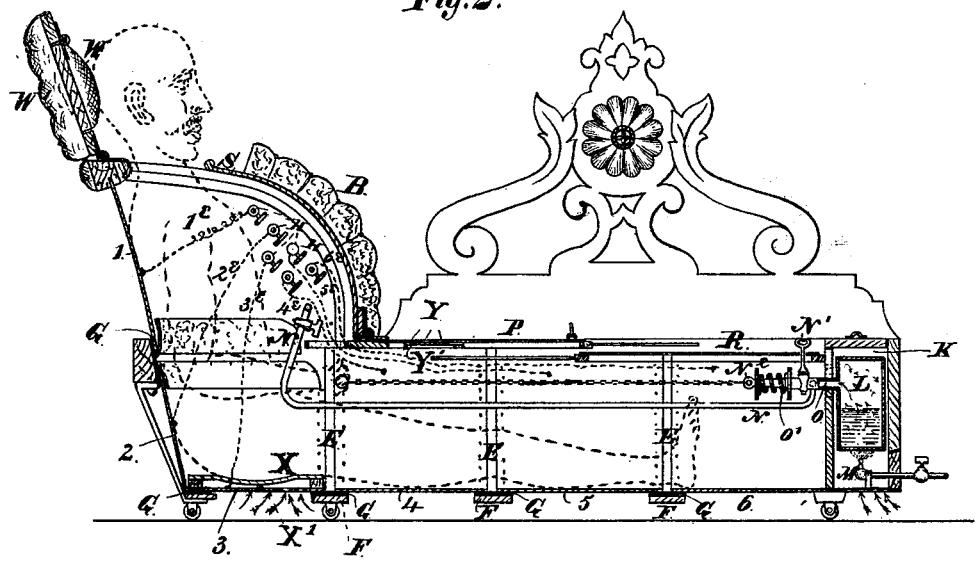

In the drawings, Figure 1 represents a side elevation of the lounge; Fig. 2, a longitudinal section of the same; Fig. 3, a plan of the lounge when opened; Fig. 4, a side elevation with the cover removed or ready for the reception of the patient. Figs. 5 and 6 are cross-sections of the receptacle and vaporizing-chamber.

As represented in Fig. 1, the entire apparatus is so arranged and combined that a complete lounge is formed for ordinary use, having a cushioned seat, as at A, and head-rest, as at B; but underneath the seat is provided a bath-receptacle, as at C, of the ordinary form of such articles, and which is suspended in the frame-work of a lounge, as at D. This receptacle is formed of several plates of metal, as zinc, tin, or other proper substitutes, suspended transversely in the frame, and with spaces between them, as at E, in which spaces an insulating substance of some kind, as rubber or any known non-conductor of electricity, is placed for the purpose of insulating the several plates from each other, so that the plate at the head may be insulated from each of the intermediate ones and be connected to the foot-plate, or either or any of the others, as may be desired. These plates or sheets of metal, forming the body of the bath-receptacle proper, are indicated in the drawings by the figures 1 2 3 4 5 6, and they are suspended within the frame D by broad straps or curved plates, whose ends are fastened to the framework, as shown in section at Fig. 5, where F represents one of said straps, and between the straps and the edges of the two plates are inserted an insulating substance, as at G, and then the edges of two adjusting-plates are fastened to the intermediate insulating-strip, as by rivets and cement, or in any suitable manner, so that the bath-tub is really formed of alternative transverse sections of metal and insulating straps or plates. The sections at the head of the bath-tub are supported in a similar manner by straight bars, as at F', that hold the sections of the tub inclined, as represented in the drawings.

To each of the several sections of metal, as 1 2 3, &c., wires are connected, as $1^e$ $2^e$ $3^e$, which are attached to binding-screws, as at H, located on the side and near the head of the bath-tub, so that the patient may, if desired, connect or disconnect either or all of said plates or sections with a battery or any agent for generating the electric current. At the foot of said bath-tub a chamber is formed for holding the generator of the vapor or the heated air, as seen at K, and in this chamber is provided a boiler, as at L, for holding water over a gas-burner or other source of heat underneath it, as at M, and a pipe leading from said boiler or vaporizer, as at N, conducts the vapor of the water along the side of the tub or bathing-receptacle toward the front, or where the patient sits, and this tube or pipe is provided with stop-cocks, as at N' and N², whereby the vapor can be controlled as desired. Another tube or inlet-pipe, as at O, is also connected to said boiler, and extends into the bath-tub a short distance at the foot, and is provided with a valve or plug on its inner end, and is held closed by a spring, as at O', which presses the plug into or upon the mouth of the tube O to close it, but may be drawn away therefrom by a cord or chain, as at O², by the patient, as desired, to vary the temperature. Sliding covers are also provided, as shown at P and R, to cover the bath-tub, and these are merely arranged to slide in grooves or on guides in the frame D in any well-known manner. The one at the head also serves to carry the shield or cover, as at S, for inclosing the front part of the body of the patient when in the bath, as represented, and said shield is formed with a section for the neck of the patient to rest in, and it may be surrounded with a cushioned edge or packing of felt to make it air or vapor tight. It is also hinged to the said cover, so that it may be turned toward the foot to permit the patient to enter the bath, and then turned back to inclose the bath. Upon the outer surface of said shield is mounted the cushion, which serves as a support for the patient when at rest upon the lounge. There is also another cushion, as at T, which serves for the seat of the lounge proper, and this is mounted on a frame, as at T', one edge of which is hinged to the edge of the frame, as at T², one edge of which is hinged to the edge of the frame supporting the bath-tub, so that it may be folded over the sliding covers, and thereby conceal them; but when opened out, as shown in the plan, Fig. 3, it serves as a resting-place for the patient to be treated, and it is supported on the outer edge by feet, as at T³, that are pivoted to the edge of its frame, and the feet may be folded to the edge when it is turned back as a seat, and thus be out of the way. Another cushioned support, as U, is hinged to the end of this frame T', and is so curved, as shown, that it serves as a head rest or support to the patient when being treated on the frame or support T. A foot-rest, as at U', is also pivoted or hinged to the other end of the frame T', which serves to give it the required length for the patient when desired. Another cushioned support is hinged at the head of the lounge, as W, for the patient's head to rest against when in the bath, as shown at Fig. 2, and the frame on which this cushion is fastened is hinged to another frame, as at W', that serves as a support for the cushion forming the head-piece of the lounge, and the two may serve to support each other, as represented in Fig. 1 by the dotted lines, to support the head or elbow of the patient when reclining on the lounge, as it is represented in Fig. 1.

Adjustable seats are also provided for the patient to rest upon when in the bath, as at X, Fig. 2, each seat consisting of a frame over which perforated material is stretched, as sheet metal, or thin wooden bottoms, as chair-seats, and underneath said seat perforations, as at X', are made in the bottom of the bath-tub to permit the cold air to rise to keep the hips of the patient cool when desired. Other perforations are made in the cover, as at Y, Figs. 2 and 3, to permit the escape of the heated air or vapor when desired, and a sliding cover is provided for closing said perforations, as represented at Y' in Fig. 2. Other perforations are also shown in the under side of the chamber, where the boiler or vaporizer is located, to admit air to the gas-jet and to permit a circulation of air from the said chamber to the bath-receptacle through other perforations, as at Z, in the partition, as shown in Fig. 6.

The entire apparatus is or may be mounted on casters, as shown in the drawings.

As already stated, such a lounge may be used for ordinary use in a room when arranged as represented in Fig. 1; but when the bath is to be used the head-rest is turned up or back, as shown at Figs. 2, 3, and 4. The seat is then turned over, as shown at Figs. 3 and 4, and the sliding cover is then shoved toward the foot, as represented in Fig. 4, and the shield is laid over on the cover, as there shown, in which condition the tub is ready for the patient. After the patient is placed therein, as is represented at Fig. 2, the sliding covers are then placed to inclose the tub, and the shield is folded back toward the breast, as in Figs. 2 and 3, leaving only the head above the shield. The height of the seat may also be determined—as, for example, a person with a short body may require two or more of the same kind of seats to be placed in proper position under the body to raise the neck to the proper height to be inclosed by the shield over the breast.

The vaporizing or heating action is then produced to the degree required, and all under the control of the patient, as already explained, by bringing the electric current into contact with either or all of the sections 1 2 3, &c., as desired, by the use of the keys or binding-screws, as shown at Fig. 2, after which the patient may recline on the support, as represented at Fig. 3, and be rubbed off or treated as desired, when the several parts may be again folded, as represented in Fig. 1, for a reclining-lounge.

Of course any kind of an electric battery or generator of electricity may be used, as that is no part of my invention, and it is evident that the form of the cushions and sliding covers may be varied, and that various kinds of material may be used for the conducting-plates as well as the insulated divisions between; but I desire to claim—

1. In a combined lounge and bath, the combination of the several metallic sections with insulating-divisions between them for forming a vaporizing-chamber, as and for the purposes hereinbefore set forth.

2. In a combined lounge and bath, as described, electrical conductors and two or more of the metallic sections, as and for the purposes set forth.

3. In a combined lounge and bath, a sectional bath-tub formed of metallic plates, with insulating-divisions between the plates, and a vaporizing or heating apparatus, as and for the purposes set forth.

4. In combination with a sectional bath-tub, as described, the boiler or vaporizer and inlet-tubes to conduct the vapor to the proper points, as described.

5. In a combined lounge and bath, the slide-covers P and R and shield S, as and for the purposes set forth.

6. In a combined lounge and bath, as described, the perforations X' underneath the seat and the perforations in the cover Y, to permit the escape of the heated air, as described.

In testimony whereof I have hereunto set my hand and seal in the presence of two subscribing witnesses.

JAMES H. LEA MOND. [L. S.]

Witnesses:
 EUGENE N. ELIOT,
 BOYD ELIOT.